United States Patent
Wimmer et al.

(10) Patent No.: US 8,233,229 B2
(45) Date of Patent: Jul. 31, 2012

(54) SYSTEMS AND METHODS FOR REDUCTION OF CROSS COUPLING IN PROXIMATE SIGNAL LINES

(75) Inventors: Robert J. Wimmer, Hastings, MN (US); Ram S. Narayan, Bloomington, MN (US); Jaydip Bhaumik, Longmont, CO (US); Michael J. Peterson, Eagan, MN (US); David W. Kelly, Lino Lakes, MN (US)

(73) Assignee: Agere Systems Inc., Allentown, PA (US)

( * ) Notice: Subject to any disclaimer, the term of this patent is extended or adjusted under 35 U.S.C. 154(b) by 1019 days.

(21) Appl. No.: 11/997,129

(22) PCT Filed: Feb. 16, 2006

(86) PCT No.: PCT/US2006/005518
§ 371 (c)(1),
(2), (4) Date: Jan. 28, 2008

(87) PCT Pub. No.: WO2007/094790
PCT Pub. Date: Aug. 23, 2007

(65) Prior Publication Data
US 2008/0297093 A1    Dec. 4, 2008

(51) Int. Cl.
*G11B 20/24* (2006.01)
(52) U.S. Cl. .................. 360/75; 360/46; 360/67
(58) Field of Classification Search ........... None
See application file for complete search history.

(56) References Cited

U.S. PATENT DOCUMENTS

| | | | |
|---|---|---|---|
| 3,806,636 A | 4/1974 | True et al. | |
| 4,967,344 A | 10/1990 | Scavezze et al. | |
| 4,991,580 A | 2/1991 | Moore | |
| 5,343,164 A * | 8/1994 | Holmdahl | 330/253 |
| 5,586,181 A | 12/1996 | Kiko | |
| 5,675,581 A | 10/1997 | Soliman | |
| 5,789,955 A * | 8/1998 | Scheraga | 327/170 |
| 5,805,871 A | 9/1998 | Baxter | |
| 5,986,839 A | 11/1999 | Klaassen et al. | |
| 6,031,389 A * | 2/2000 | Fotouhi et al. | 326/31 |
| 6,040,686 A * | 3/2000 | Schenkel | 323/282 |
| 6,057,972 A * | 5/2000 | Castellucci | 360/66 |
| 6,137,356 A * | 10/2000 | Sakuragi | 330/86 |
| 6,184,703 B1 * | 2/2001 | Vest et al. | 326/27 |
| 6,201,417 B1 * | 3/2001 | Blum et al. | 327/14 |
| 6,222,403 B1 * | 4/2001 | Mitsuda | 327/170 |
| 6,359,484 B1 * | 3/2002 | Ajit | 327/170 |
| 6,411,056 B1 | 6/2002 | Ikedo | |

(Continued)

FOREIGN PATENT DOCUMENTS

JP    2002083401    3/2002

*Primary Examiner* — Hoa T Nguyen
*Assistant Examiner* — James L Habermehl
(74) *Attorney, Agent, or Firm* — Hamilton, DeSanctis & Cha

(57) ABSTRACT

Various systems and methods for reducing cross coupling in proximate signals are disclosed. As one example, a system for reducing cross-coupling in adjacent signals that includes an active slew rate limiter circuit is disclosed. The active slew rate limiter circuit is operable to receive an input signal, and to provide an output signal based on the input signal with a controlled slew rate. In some cases, such systems may be included within a storage device that includes a read head. In such cases, the systems may operate to assure a substantially constant power dissipation within the read head.

29 Claims, 8 Drawing Sheets

U.S. PATENT DOCUMENTS

| | | | |
|---|---|---|---|
| 6,437,622 B1* | 8/2002 | Tinsley et al. | 327/175 |
| 6,441,653 B1* | 8/2002 | Spurlin | 327/108 |
| 6,657,469 B1* | 12/2003 | Li | 327/170 |
| 6,958,591 B1* | 10/2005 | Smith | 320/163 |
| 7,132,847 B1* | 11/2006 | Wong et al. | 326/29 |
| 2002/0067645 A1 | 6/2002 | Ohmori et al. | |
| 2002/0181141 A1* | 12/2002 | Kuroiwa et al. | 360/77.02 |
| 2003/0090309 A1* | 5/2003 | Hunt | 327/309 |
| 2004/0036502 A1* | 2/2004 | Tangen | 326/82 |
| 2004/0063414 A1* | 4/2004 | Kasperkovitz | 455/260 |
| 2004/0221188 A1 | 11/2004 | Lau et al. | |
| 2005/0135168 A1* | 6/2005 | Kim | 365/201 |
| 2005/0180299 A1* | 8/2005 | Kobayashi et al. | 369/124.12 |
| 2005/0190873 A1 | 9/2005 | Smith et al. | |
| 2006/0165039 A1 | 7/2006 | Lyon et al. | |
| 2006/0176087 A1* | 8/2006 | Gupta et al. | 327/108 |

\* cited by examiner

SYSTEMS AND METHODS FOR REDUCTION OF CROSS COUPLING IN PROXIMATE SIGNAL LINES

BACKGROUND OF THE INVENTION

The present invention is related to systems and methods for reducing cross coupling in proximate signal lines, and in particular to systems and methods for moderating the slew rate of one or more signals.

Typical electronics products include connectors where two or more signal lines are located adjacent to one another. Cross coupling between the proximate signal lines is possible in such cases, with the amount of cross coupling varying as a function of the distance between the proximate signal lines and the rate at which the proximate signal lines are switching. This relationship is described by the following equation:

$$I=C*dV/dt.$$

In many cases, any cross coupling may simply be ignored or filtered. However, in some cases, it may be desirable to minimize the occurrence of cross coupling. This minimization may be achieved by moving two signals associated with the cross coupling farther from one another, thus reducing the value of C in the aforementioned equation. This approach, however, may be impractical where space is at a premium, or where conformance with a standard form factor is required. Another solution for reducing the cross coupling is to limit the rate at which the proximate signal lines are switching. This may be achieved by applying the signal to an RC network. Such an RC network, however, provides for a substantially non-constant slew rate as defined by the following equation:

$$V=e^{(-t/RC)}.$$

In some cases, this substantially variable slew rate is undesirable.

As a concrete example, it is common for a fly height driver signal and a read signal in a disk drive connector to be located very close to one another due to standardized layout specifications. Because of this proximity and the rate at which the fly height driver signal switches, it is possible to have very substantial cross coupling between the signals. For example, in one case the capacitance (C) between the read signal line and the fly height driver signal line may be one picofarad, and the fly height driver signal line may be switching a one volt signal with a one hundred picosecond rise time. Using the aforementioned equation, the cross coupling induced current between read signal and the fly height driver signal is approximately ten milliamps. Such a substantial current can result in a reliability reduction.

Hence, for at least the aforementioned reasons, there exists a need in the art for advanced systems and methods for reducing cross coupling between proximate signals.

BRIEF SUMMARY OF THE INVENTION

The present invention is related to systems and methods for reducing cross coupling in proximate signal lines, and in particular to systems and methods for moderating the slew rate of one or more signals.

Various systems and methods for reducing cross coupling in proximate signals are disclosed. As one example, a system for reducing cross-coupling in adjacent signals that includes an active slew rate limiter circuit is disclosed. The active slew rate limiter circuit is operable to receive an input signal, and to provide an output signal based on the input signal with a controlled slew rate. In some cases, such systems may be included within a storage device that includes a read head. In such cases, the systems may operate to assure a substantially constant power dissipation within the read head (or read/write head assembly as the case may be).

Some embodiments of the present invention provide systems for reducing cross coupling in proximate signals. Such systems include an active slew rate limiter circuit that is electrically coupled to a signal input and provides a signal output. The active slew rate limiter circuit may comprise a capacitance and at least one active element such as, for example, a transistor. In some cases, the systems further include a feedback circuit operable to receive an output from the active slew rate limiter circuit, and to provide a feedback input to the active slew rate limiter circuit. In particular, the feedback circuit includes a voltage to current converter and a third order multiplier. In the feedback circuit, the third order multiplier is electrically coupled to the voltage to current converter circuit. The voltage to current converter receives a voltage output from the active slew rate limiter circuit, and provides a current output to the third order multiplier. In turn, the third order multiplier circuit provides a feedback input to the active slew rate limiter circuit.

In some instances of the embodiments, the systems further include an output circuit. The output circuit includes a second order multiplier and a driver. The output from the active slew rate limiter circuit is provided to the second order multiplier, and an output from the second order multiplier is provided to the driver. The output of the driver is provided as the system output, and is also provided as feedback to the second order multiplier.

In various instances of the embodiments, the systems may be selectably configured to operate in either a power mode or a voltage mode. In one particular case, the system output is provided as a fly height driver signal associated with a storage device. In such a case, selecting the power mode results in substantially constant power dissipation in a read head of the storage device. In another case, selection of the voltage mode causes the output from the active slew rate limiter circuit to be provided directly to the second order multiplier, and the feedback circuit is bypassed.

Other embodiments of the present invention provide storage devices that include a storage media, a read head, and a slew rate control circuit. The read head is disposed adjacent to the storage media and is operable to access information maintained on the storage media. Further, the fly height control resistor is electrically coupled to the slew rate control circuit, and the slew rate control circuit is operable to cause the fly height resistor to dissipate power at a substantially constant rate. In some cases, the storage media is a hard disk drive platter. In various cases, the slew rate control circuit includes a signal input, a signal output, and an active slew rate limiter circuit.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for reducing cross coupling in proximate signal lines, and in particular to systems and methods for moderating the slew rate of one or more signals.

As used herein, the phrase "electrically coupled" is used in its broadest sense to mean any form of coupling whereby an electrical signal may be transferred from one device to another. Thus, an electrical coupling may be, but is not limited to, coupling via a conductive wire, coupling via a resistor, coupling via a capacitor, coupling via an inductor, coupling via a transistor, any combination of the aforementioned, and/or the like. Further, it should be noted that various particular transistor types are used herein to describe exemplary embodiments of the present invention, but that one of ordinary skill in the art will recognize that other transistor types may be used to implement circuits conforming to other embodiments of the present invention. Thus, for example, one of ordinary skill in the art will recognize that some circuits implemented with NMOS transistors may also be implemented using PMOS transistors, and vice versa. Further, in some cases, bipolar transistors may be used in relation to various embodiments of the present invention. In addition, some embodiments of the present invention are discussed in relation to a hard disk drive system, however, this should not be considered limiting to the scope of the invention, and based on the disclosure provided herein, one of ordinary skill in the art will recognize other systems and/devices to which embodiments of the present invention may be applied. Also, a "read head" is discussed herein and should be understood to mean either a stand alone read head or a more common read/write head assembly.

Figure 1A:
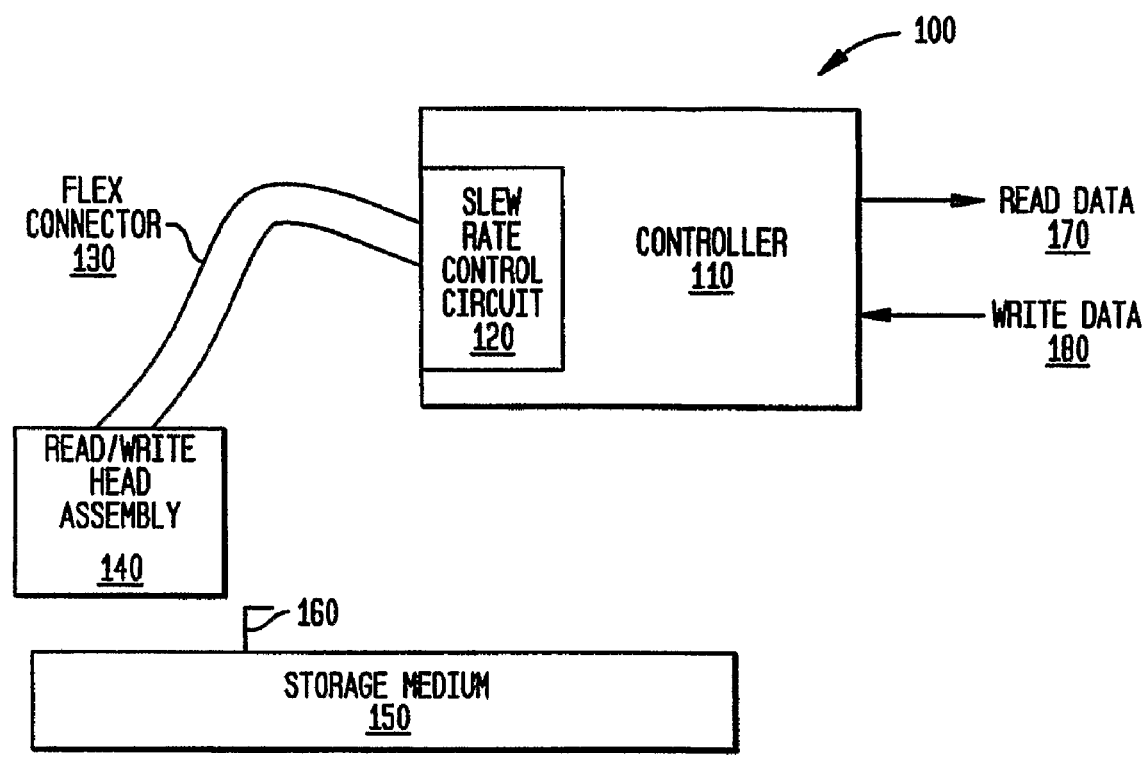
FIGS. 1a-1b depict a storage system providing an active slew rate control in accordance with one or more embodiments of the present invention.
Figure 1B:
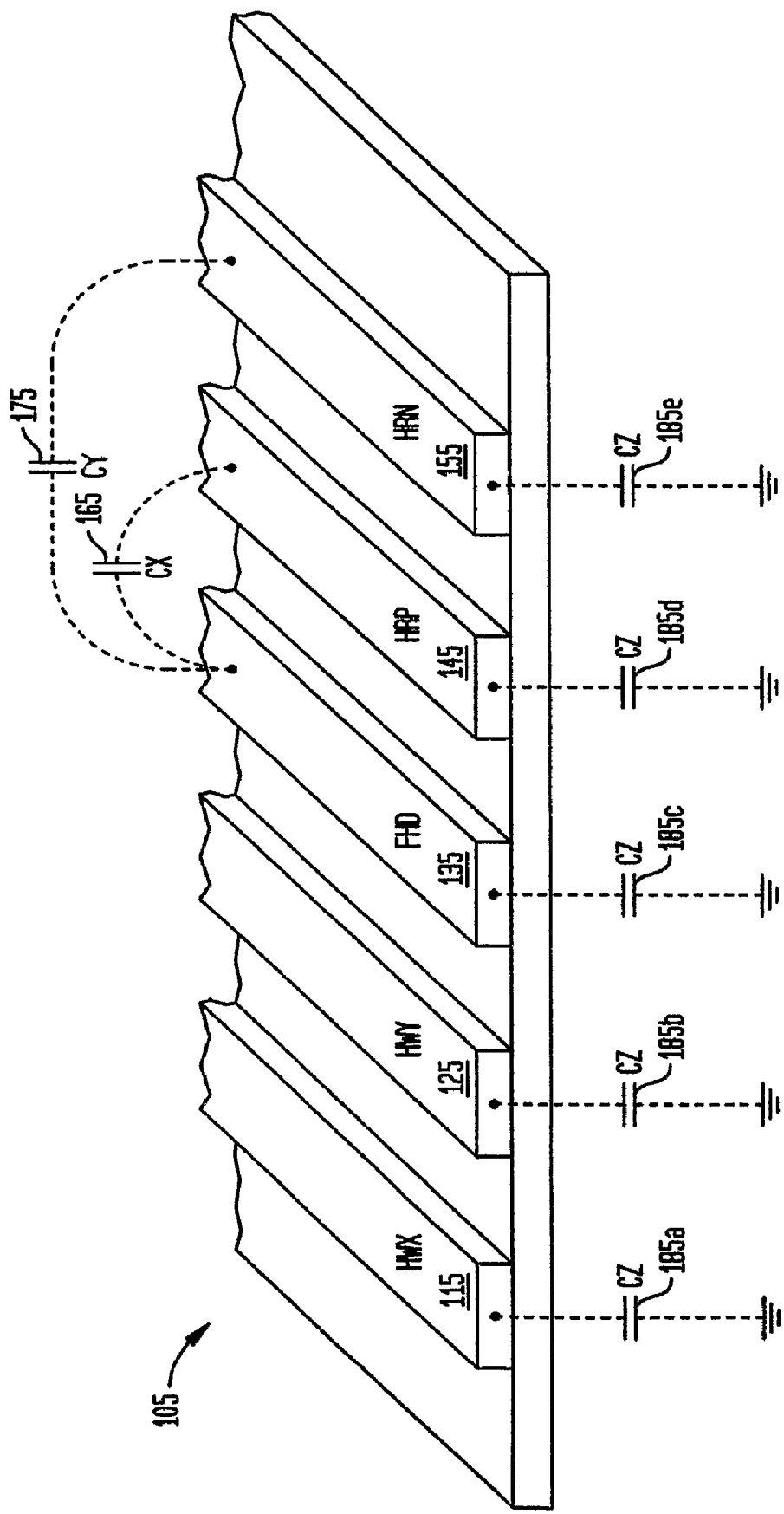

Turning to FIGS. 1a-1b, a storage system 100 including an active slew rate control circuit 120 in accordance with one or more embodiments of the present invention is depicted. Storage system 100 includes a read/write head assembly 140 disposed a distance 160 from a surface of a storage medium 150. Read/write head assembly 140 is operable, among other things, to detect stored information maintained on storage medium 150 as is known in the art. Read/write head assembly 140 transfers the detected information to a controller 110 via a flex connector 130. In one case, flex connector 130 includes two read lines, two write lines, and a fly height driver line as are shown and more fully described in relation to FIG. 1b below. The information transferred to and from storage medium 150 is provided to controller 110 via a read data interface 170 and a write data interface 180.

Controller 110 includes active slew rate control 120 that is operable to control the slew rate of one or more of the signals being transferred between controller 110 and read/write head assembly 140. In some cases, read/write head assembly 140 includes operational characteristics that impact the value of distance 160. In particular, an error rate associated with read/write head assembly 140 may be reduced where distance 160 is minimized, and read/write head assembly 140 exhibits an expansion characteristic that varies in proportion to the amount of power dissipated by read/write head assembly 140. Thus, it may be desirable to reduce any variance in the power dissipated by read/write head assembly 140 to allow minimization (e.g., tighter control) of distance 160. In some cases, active slew rate control circuit 120 provides a mechanism for reducing the variance of power dissipated by read/write head assembly 140 through controlling cross coupling between various signals transferred via flex connector 130.

Read/write head assembly 140, storage medium 150, flex connector 130, and controller 110 less active slew rate control circuit 120 are components that are typically found in hard disk drive storage systems and other types of systems, and are well known in the art. Further, it should be noted that system 100 is merely exemplary of many embodiments of the present invention, and that one of ordinary skill in the art will recognize a variety of other systems to which an active slew rate control in accordance with embodiments of the present invention may be applied.

Turning to FIG. 1b, the signals provided via flex connector 130 are depicted as a signal set 105. In particular, signal set 105 includes two read lines (HRP 145 and HRN 155), two write lines (HWX 115 and HWY 125), and a fly height driver line 135. As depicted by capacitors 185, each of the signals exhibits some capacitive coupling (Cz) to ground. In addition, each of the signals exhibits some capacitive coupling between each other. Two of these capacitive couplings (a Cx 165 and a Cy 175) are shown for explanation purposes. As capacitance varies in proportion to area divided by distance, Cx 165 has a value that is approximately proportional to the area of the side of fly height driver line 135 that is facing the adjacent side of HRP 145 divided by the distance between the two facing sides. Similarly, Cy 175 has a value that is approximately proportional to the area of the side of fly height driver line 135 that is facing the most adjacent side of HRN 155 divided by the distance between the two facing sides. Assuming equal areas, the Cy 175 is substantially less than Cx 165 because of the greater distance between fly height driver line 135 and HRN 155. As cross coupling increases in proportion to the increase in capacitance, the cross coupling between fly height driver line 135 and HRP 145 will be greater than that exhibited between fly height driver line 135 and HRN 155. Cross coupling may be reduced in both cases, however, by limiting the slew rate of signals carried on fly height driver line 135. Accordingly, some embodiments of the present invention include conditioning the signal carried on fly height driver line 135 using active slew rate control circuit 120.

In one exemplary embodiment of the present invention the typical voltage applied to fly height driver line 135 ranges between 0.0 Volts to +1.0 Volts with a resistance that ranges between forty and one hundred, ten Ohms. In such a case, active slew rate control circuit 120 is operable to maintain the slew rate exhibited on fly height driver line 135 to approximately one millivolt per nanosecond (1 mV/ns) to limit the differential voltage coupling into read/write head assembly 140 to 0.4 millivolt for a four hundred Ohm resistor and a one picofarad coupling capacitor.

Turning to FIGS. 2a-2d, one embodiment of an active slew rate controller circuit 200 in accordance with one or more embodiments of the present invention is illustrated. Active slew rate control circuit 200 includes a digital to analog converter 210 that receives a digital input code 280 (e.g., 0 to 63), and provides an output current 282 ($I_{282}$) corresponding to digital input code 280. Digital input code 280 corresponds to a fixed power that is to be delivered to the pad of fly height driver line 135. In some embodiments, digital input code 280 converted by digital to analog converter 210 ranges between five and one hundred, twenty five microamperes. Anytime digital input code 280 changes, a corresponding change in output current 282 from digital to analog converter 210 occurs. The current transition may exhibit a very large slew rate that results in cross coupling between fly height driver line 135 and other proximate lines.

Current 282 of digital to analog converter 210 is provided to slew rate limiter circuit 220 which operates in conjunction with other elements of active slew rate control circuit 200 to provide an output with a governed slew rate when compared with the slew rate of transitioning current 282, and thereby to lower cross coupling evident at the associated read/write head assembly. Slew rate limiter circuit 220 converts current 282 from digital to analog converter 210 to a representative voltage, and provides a voltage output 222 to a voltage to current converter 230. Voltage to current converter 230 converts the received voltage 222 to a current 232 ($I_{232}$), and provides current 232 to a third order multiplier 240 that multiplies current 232 to provide a current 242 ($I_{242}$). Current 242 is fed back to active slew rate limiter circuit 220 where it acts as a variable current source that in part controls the slew rate of output voltage 222 by providing $I_{tail}$ as discussed below in relation to FIG. 2b below.

In addition, a current proportional to the desired output power (i.e., a target current 234 ($I_{234}$)) is provided by voltage to current converter 230 to a second order multiplier 250. Current 234 is a mirrored copy of current 232. In addition, a feedback voltage 262 ($V_{pad}$), a feedback current 261 ($I_{pad}/k$), and a bias current ($I_{bias}$) 254a that is used as a gain controlling factor are provided to second order multiplier 250. Second order multiplier 250 converts voltage 262 to a current equal to Vpad divided by Rpp ($I_{pp}$). In turn, $I_{pp}$ is multiplied by $I_{pad}/K$ and divided by $I_{bias}$, and the product of the multiplied and divided currents is compared with target current 234. Second order multiplier 250 additionally functions as an operational amplifier, driving Vpad 290 through driver 260 such that the product of the multiplied and divided currents is equal to target current 234. Output 252 is provided to a driver 260 that drives a current output 292 ($I_{pad}$) through a fly height resistor 292 associated with a fly height pad 294 to ground. This results in a pad voltage ($V_{pad}$) 290 at fly height pad 294.

In some embodiments of the present invention, the power delivered to fly height resistor 292 is substantially constant. The expression of the power dissipated by fly height resistor ($R_{FH}$) 292 is provided by the following equation:

$$V_{pad} * I_{pad} = k * R_{pp} * I_{bias} * I_{234},$$

where k is the gain of driver 260, $V_{pad}$ is the voltage at fly height pad 294, $I_{pad}$ is the current flowing through fly height resistor 292, $R_{pp}$ is a sense resistor associated with driver 260, $I_{bias}$ is the current used in second order multiplier 250, and $I_{234}$ is the slew rate controlled current output from voltage to current converter 230. Solving the preceding equation for slew rate proceeds as follows:

$$\sqrt{V_{pad}^2} = \sqrt{k R_{FH} R_{pp} I_{bias} I_{234}}, \text{ therefor}$$

$$\frac{dV_{pad}}{dt} = \sqrt{k R_{FH} R_{pp} I_{bias}} * \frac{d\sqrt{I_{234}}}{dt}, \text{ and therefor}$$

$$\frac{dV_{pad}}{dt} = \sqrt{k R_{FH} R_{pp} I_{bias}} * \frac{1}{2} * \frac{1}{\sqrt{I_{234}}} * \frac{dI_{234}}{dt}.$$

Thus, the voltage slew rate at fly height pad 294 is a function of $I_{234}$, Rpp and fly height resistor 292.

As a concrete example, $I_{234}$ varies between five and one hundred, twenty five microamperes, Rpp varies from five to fifteen kOhms (for a nominal ten kOhm resistance value) due to process variation, and fly height resistor 292 varies from forty to one hundred, ten Ohms. Thus, the slew rate can vary by as much as one thousand, three hundred, thirty-six percent according to the following equation:

$$\text{Maximum Variance} = \sqrt{\frac{I_{234},\max}{I_{234},\min} * \frac{Rpp,\max}{Rpp,\min} * \frac{Rfh,\max}{Rfh,\min}} - 1 * 100\%.$$

If fly height resistor was to be maintained constant, the variation in the slew rate could be reduced to seven hundred, sixty-six percent. However, this variation may still be too much for many applications.

The feedback loop including third order multiplier 240 may be designed to further reduce this variance. For example, a circuit satisfying the following equation may be provided:

$$\frac{dI_{234}}{dt} \propto \frac{\sqrt{I_{234}}}{\sqrt{R_{pp}}}.$$

Where the preceding equation is satisfied, the following slew rate is achieved:

$$\text{Slew Rate} = \frac{dV_{pad}}{dt} \propto \sqrt{R_{FH}}.$$

Based on the preceding equation, the maximum slew rate variation may be reduced to sixty-six percent for the preceding assumptions. This variation is due only to the variance of fly height resistor 292 between forty and one hundred, ten Ohms.

To achieve $$\frac{dI_{234}}{dt} \propto \frac{\sqrt{I_{234}}}{\sqrt{R_{pp}}},$$

third order multiplier 240 may be designed to produce current 242 that is proportional to $\sqrt{I_{234} * R_{pp}}$. This may be done by designing a third order multiplier circuit using complimentary metal oxide semiconductor (CMOS) transistors in weak inversion. Third order multiplier 240 operates in accordance with the following equation:

$$I_1 * I_2 * I_3 = I_4 * I_5 * I_6.$$

In one particular embodiment of the present invention, third order multiplier 340 is designed such that both $I_1$ and $I_2$ are equivalent to $I_{bias}$, $I_3$ is equivalent to $I_{234}$, $I_4$ is equivalent to $I_{ppref}$ (Vref/Rpp), and $I_5$ and $I_6$ are equivalent to $I_{242}$. Where the aforementioned design decisions are made, the following solution for current 242 proceeds from the following equation:

$$I_{bias} * I_{bias} * I_{234} = I_{ppref} * I_{242} * I_{242}, \text{ therefor}$$

$$I_{bias} * I_{bias} * I_{234} = \frac{V_{ref}}{R_{pp}} * I_{242} * I_{242}, \text{ and therefor}$$

$$I_{242} \propto \sqrt{I_{234} * R_{pp}}$$

Current 242 is fed back to active slew rate limiter circuit 220 to produce the desired slew rate control.

Figure 2A:
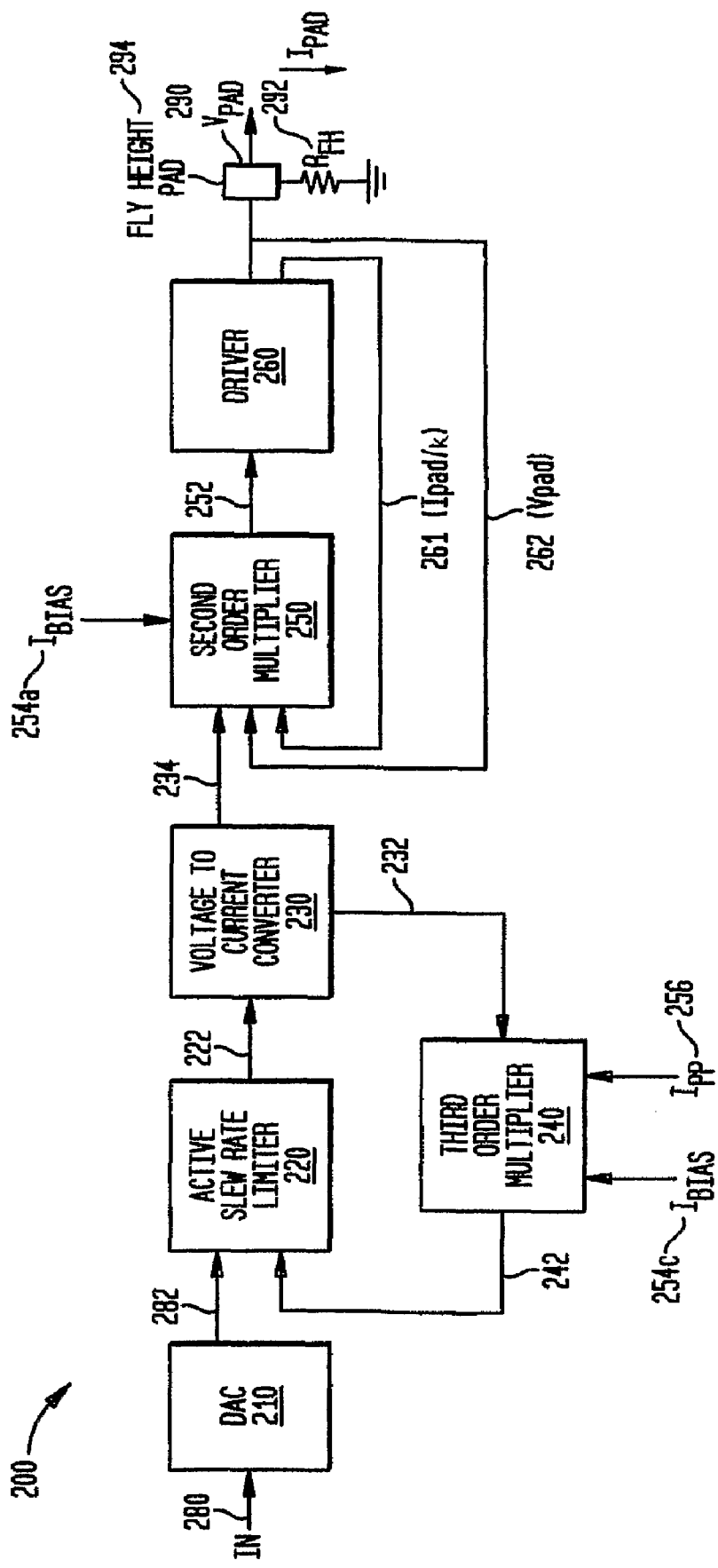
FIGS. 2a-2d depict an active slew rate control in accordance with one or more embodiments of the present invention.
Figure 2B:
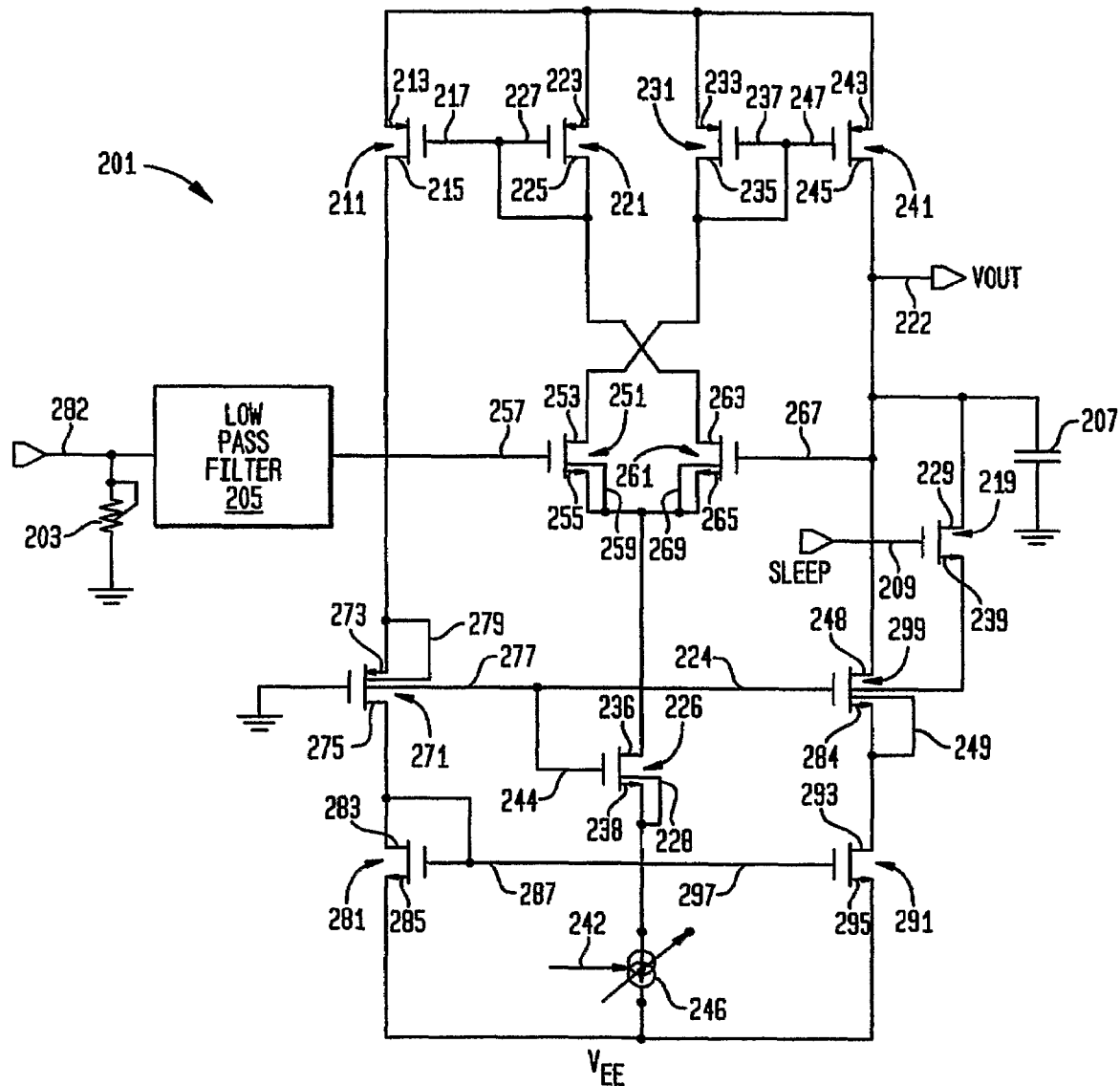

Turning now to FIG. 2b, a schematic is depicted of an exemplary slew rate limiter circuit 201 that may be used in place of slew rate limiter circuit 220 in accordance with one or more embodiments of the present invention. Current 282 from digital to analog controller 210 flows through a resistor 203 producing an input voltage at the input of a low pass filter 205. Low pass filter 205 operates to eliminate any high frequency noise from the input voltage, and may be any low pass filter known in the art. In one particular embodiment, low pass filter 205 is an RC network. Upon filtering, the input voltage is provided to a gate 257 of an NMOS transistor 251. NMOS transistor 251 is self-tubbed with a body 259 electrically connected to a source 255. Voltage output 222 is electrically coupled to a gate 267 of an NMOS transistor 261 that is also self-tubbed with a base 269 electrically connected to a source 265. Source 255 is electrically coupled to source 265, and both sources are electrically coupled to a variable current source 246. In some cases, variable current source 246 is equivalent to current 242 from third order multiplier 240. Further, voltage output 222 is electrically coupled to ground via a capacitor 207.

In some cases, the aforementioned electrical coupling between sources 255, 265 and current source 246 is done via a series of transistors 271, 299 and 226 that are included as cascodes to avoid breakdown problems. In the case where the circuit is powered by VCC at 3.3 Volts and VEE at −2.1 Volts, there is a risk of overstressing 3.3 Volt transistors, and thus transistors 271, 299 and 226 are included to split up the voltage. In particular, transistor 271 is a PMOS transistor with a gate 277, a drain 275 and a source 273; transistor 299 is an NMOS transistor with a gate 224, a drain 248, and a source 284; and transistor 226 is an NMOS transistor with a gate 244, a drain 236, and a source 238. PMOS transistor 271 is self-tubbed with source 273 electrically coupled to a body 279, NMOS transistor 299 is self-tubbed with source 284 electrically coupled to a body 249, and NMOS transistor 226 is self-tubbed with source 238 electrically coupled to a body 228. In some cases, a transistor 219 is included to allow the circuit to be placed in a sleep mode. Transistor 219 is an NMOS transistor 219 with a gate 209, a drain 229, and a source 239. Drain 229 of NMOS transistor 219 is electrically coupled to gate 267 of NMOS transistor 261; and source 239 of NMOS transistor 219 is electrically coupled to gate 224 of NMOS transistor 299, gate 244 of NMOS transistor 226, and gate 277 of PMOS transistor 271. In operation, when a sleep signal is asserted and applied to gate 209, exemplary slew rate limiter circuit 201 is turned off.

Three current mirrors are used in exemplary slew rate limiter circuit 201. One of the current mirrors is composed of a PMOS transistor 211 and a PMOS transistor 221. A gate 217 of PMOS transistor 211 is electrically coupled to a gate 227 of PMOS transistor 221, and the gates are electrically coupled to a drain 225 of PMOS transistor 221. Drain 225 is also electrically coupled to a drain 263 of NMOS transistor 261. In addition, a source 213 of PMOS transistor 211 and a source 223 of PMOS transistor 221 are electrically coupled to VCC.

Another of the current mirrors is composed of a PMOS transistor 231 and a PMOS transistor 241. A gate 247 of PMOS transistor 241 is electrically coupled to a gate 237 of PMOS transistor 231, and the gates are electrically coupled to a drain 235 of PMOS transistor 231. Drain 235 is also electrically coupled to a drain 253 of NMOS transistor 251. In addition, a source 233 of PMOS transistor 231 and a source 243 of PMOS transistor 241 are electrically coupled to VCC, and a drain 245 of PMOS transistor 241 is electrically coupled to gate 267 of NMOS transistor 261.

The other current mirror is composed of an NMOS transistor 281 and an NMOS transistor 291. A gate 287 of NMOS transistor 281 is electrically coupled to a gate 297 of NMOS transistor 291, and the gates are electrically coupled to a drain 283 of NMOS transistor 281. Drain 283 is also electrically coupled to a drain 215 of PMOS transistor 211. In addition, a source 285 of NMOS transistor 281 and a source 295 of NMOS transistor 291 are electrically coupled to VEE, and a drain 293 of NMOS transistor 291 is electrically coupled to gate 267 of NMOS transistor 261. Where the aforementioned sleep circuit is implemented, the electrical coupling between drain 283 and drain 215, and the electrical coupling between drain 293 and gate 267 are via cascode transistors 271 and 299, respectively.

Configured as such, voltage output 222 (gate 267) is op-amp buffered with a slower rise time than the voltage applied to gate 257. Capacitor 207 ($C_{out}$) together with current source 246 ($I_{tail}$) define the slew rate of voltage output 222 ($V_{out}$) according to the following equations:

$$\frac{dVOUT}{dt} = \frac{I_{tail}}{C_{out}},$$

where the input voltage differs with the output voltage; and $$\frac{dVOUT}{dt} = 0$$

when the circuit is balanced.

Figure 2C:
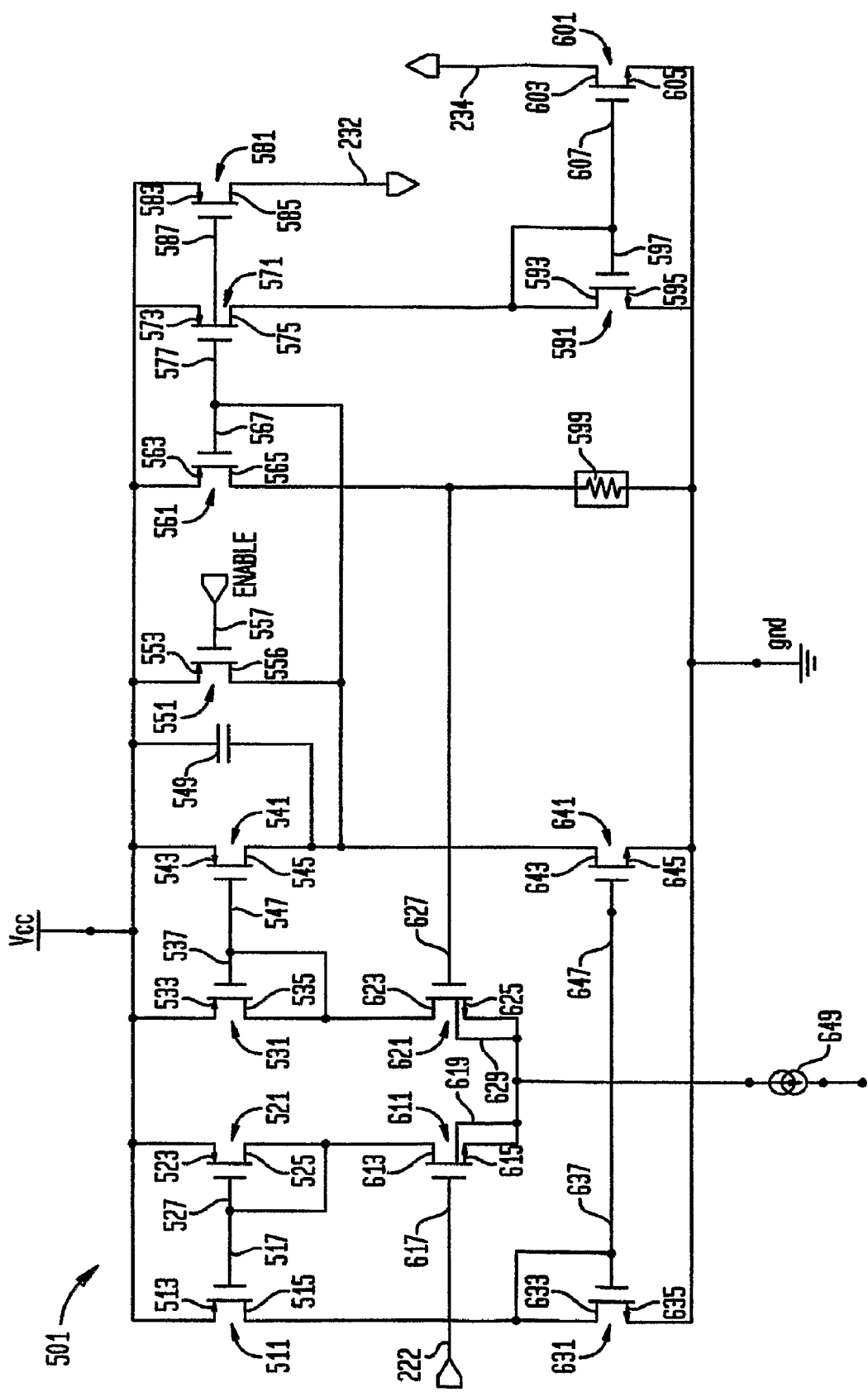

Turning to FIG. 2c, a schematic depicts an exemplary voltage to current converter 501 that may be used in place of voltage to current converter 230 in accordance with one or more embodiments of the present invention. Following the schematic, voltage output 222 drives a gate 617 of an NMOS transistor 611. NMOS transistor 611 includes a body 619, a source 615 and a drain 613; and is self-tubbed with body 619 electrically coupled to source 615. Source 615 is electrically coupled to a current source 649. In addition, source 615 is electrically coupled to a source 625 of an NMOS transistor 621. NMOS transistor 621 additionally includes a gate 627, a drain 623 and a body 629; and is self-tubbed with body 629 electrically coupled to source 625.

Three current mirrors are used in exemplary voltage to current converter 501. One of the current mirrors is composed of a PMOS transistor 511 and a PMOS transistor 521. A gate 517 of PMOS transistor 511 is electrically coupled to a gate 527 of PMOS transistor 521, and the gates are electrically coupled to a drain 525 of PMOS transistor 521. Drain 525 is also electrically coupled to drain 613 of NMOS transistor

611. In addition, a source 513 of PMOS transistor 511 and a source 523 of PMOS transistor 521 are electrically coupled to VCC.

Another of the current mirrors is composed of a PMOS transistor 531 and a PMOS transistor 541. A gate 547 of PMOS transistor 541 is electrically coupled to a gate 537 of PMOS transistor 531, and the gates are electrically coupled to a drain 535 of PMOS transistor 531. Drain 535 is also electrically coupled to drain 623 of NMOS transistor 621. In addition, a source 533 of PMOS transistor 531 and a source 543 of PMOS transistor 541 are electrically coupled to vCC.

The other current mirror is composed of an NMOS transistor 631 and an NMOS transistor 641. A gate 637 of NMOS transistor 631 is electrically coupled to a gate 647 of NMOS transistor 641, and the gates are electrically coupled to a drain 633 of NMOS transistor 631. Drain 633 is also electrically coupled to a drain 515 of PMOS transistor 511. In addition, a source 635 of NMOS transistor 631 and a source 645 of NMOS transistor 641 are electrically coupled to ground, and a drain 643 of NMOS transistor 641 is electrically coupled to a drain 545 of PMOS transitor 541. In addition, drain 545 of PMOS transistor 541 is electrically coupled to VCC via a capacitor 549.

Exemplary voltage to current converter 501 further includes an output stage capable of providing two equivalent output currents 232, 234. The output stage includes an PMOS transistor 561, a PMOS transistor 571, a PMOS transistor 581, a resistor 599, an NMOS transistor 591, and an NMOS transistor 601. A gate 567 of PMOS transistor 561 is electrically coupled to drain 545 of PMOS transistor 541, to a gate 577 of PMOS transistor 571, and to a gate 587 of PMOS transistor 581. A source 563 of PMOS transistor 561 and a source 573 of PMOS transistor 571 are electrically coupled to VCC. A drain 565 of PMOS transistor 561 is electrically coupled to gate 627 of NMOS transistor 621, and to ground via resistor 599. A source 583 of PMOS transistor 581 is electrically coupled to VCC, and a drain 585 of PMOS transistor 581 drives current 232.

NMOS transistor 591 and NMOS transistor 601 are configured as a current mirror, and are operable to drive current 234, which is a replica of current 232. In particular, a gate 597 of NMOS transistor 591 and a gate 607 of NMOS transistor 601 are electrically coupled to one another, and to a drain 593 of NMOS transistor 591. Drain 593 is also electrically coupled to a drain 575 of PMOS transistor 571. A source 595 of NMOS transistor 591 and a source 605 of NMOS transistor 601 are electrically coupled to ground, and a drain 603 of NMOS transistor 603 drives current 234.

In operation, voltage output 222 from slew rate limiter circuit 22 is received at gate 617 of NMOS transistor 611 and is buffered and dropped across resistor 599. In some embodiments, resistor 599 is a pplus resistor (Rpp) available on some semiconductor devices. Dropping voltage 222 across resistor 599 results in a current passing via PMOS transistor 561 through resistor 599 to ground. This current is then mirrored out as current 232 and current 234.

Exemplary voltage to current converter 501 may also include an enable circuit comprised of a PMOS transistor 551 with a gate 557 thereof electrically coupled to an enable input signal. A source 553 of transistor 551 is electrically coupled to VCC, and a drain 556 of transistor 551 is electrically coupled to drain 545 of transistor 541 and to gate 567 of transistor 561. When the enable input signal is asserted, exemplary voltage to current converter 501 provides current 232 and current 234 based on voltage 222. When the enable input signal is not asserted, current 232 and current 234 are disabled.

Figure 2D:
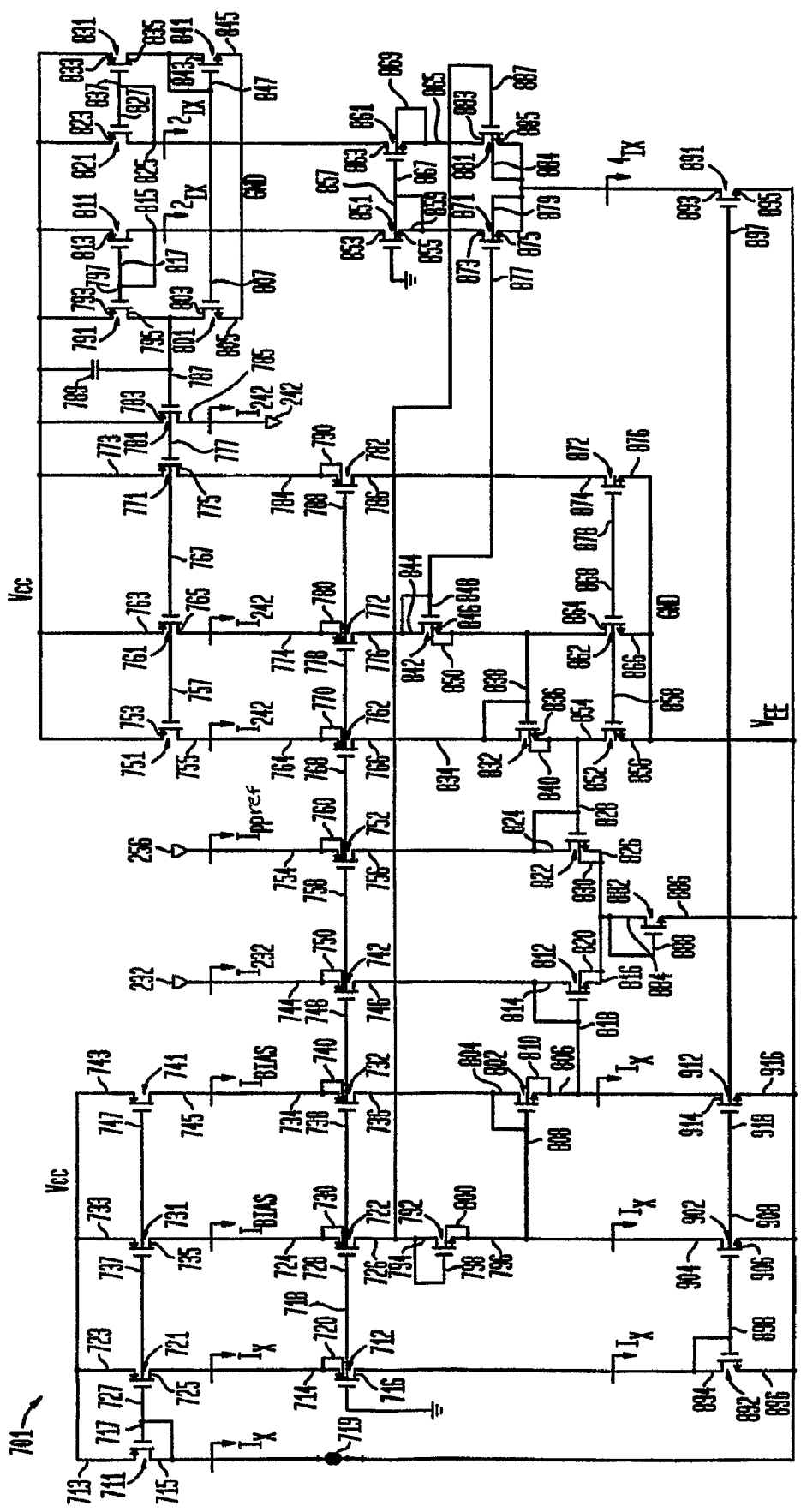

Turning to FIG. 2d, a schematic depicts an exemplary third order multiplier 701 that may be used in place of third order multiplier 240 in accordance with one or more embodiments of the present invention. Third order multiplier 701 consists of a series of three diode connected NMOS transistors in weak inversion on each side with the total gate to source voltages of the sets of three NMOS transistors equalized by a feedback. Thus, third order multiplier 701 includes six diode connected NMOS transistors through which six distinct currents flow. In this case, the six currents are $I_{bias}$, $I_{bias}$, $I_{232}$, $I_{ppref}$, $I_{242}$, and $I_{242}$, and are managed according to the equations discussed above, and reproduced here for the reader's convenience:

$$I_{bias}*I_{bias}*I_{234}=I_{ppref}*I_{242}*I_{242}.$$

Exemplary third order multiplier 701 provides current 242 to slew rate limiter circuit 220.

More particularly, exemplary third order multiplier 701 includes a series of six diode connected NMOS transistors 792, 802, 812, 822, 832, 842. NMOS transistor 792 is self-tubbed with a source 796 electrically coupled to a body 800 of NMOS transistor 792. A gate 798 of NMOS transistor 792 is electrically coupled to a drain 794 thereof. NMOS transistor 802 is self-tubbed with a source 806 electrically coupled to a body 810 of NMOS transistor 802. A gate 808 of NMOS transistor 802 is electrically coupled to a drain 804 thereof. NMOS transistor 812 is self-tubbed with a source 816 electrically coupled to a body 820 of NMOS transistor 812. A gate 818 of NMOS transistor 812 is electrically coupled to a drain 814 thereof. NMOS transistor 822 is self-tubbed with a source 826 electrically coupled to a body 830 of NMOS transistor 822. A gate 828 of NMOS transistor 822 is electrically coupled to a drain 824 thereof. NMOS transistor 832 is self-tubbed with a source 836 electrically coupled to a body 840 of NMOS transistor 832. A gate 838 of NMOS transistor 832 is electrically coupled to a drain 834 thereof. NMOS transistor 842 is self-tubbed with a source 846 electrically coupled to a body 850 of NMOS transistor 842. A gate 848 of NMOS transistor 842 is electrically coupled to a drain 844 thereof.

Source 796 of NMOS transistor 792 is electrically coupled to gate 808 of NMOS transistor 802, and to a drain 904 of an NMOS transistor 902. A source 906 of NMOS transistor 902 is electrically coupled to VEE. Source 806 of NMOS transistor 802 is electrically coupled to gate 818 of NMOS transistor 812, and to a drain 914 of an NMOS transistor 912. A source 916 of NMOS transistor 912 is electrically coupled to VEE. Source 816 of NMOS transistor 812 is electrically coupled to source 826 of NMOS transistor 822, and to a gate 888 and a drain 884 of an NMOS transistor 882. A source 886 of NMOS transistor 882 is electrically coupled to VEE. Source 836 of NMOS transistor 832 is electrically coupled to gate 828 of NMOS transistor 822, and to a drain 854 of NMOS transistor 852. A source 856 of NMOS transistor 852 is electrically coupled to VEE. Source 846 of NMOS transistor 842 is electrically coupled to gate 838 of NMOS transistor 832, and to a drain 864 of an NMOS transistor 862. A source 866 of NMOS transistor 862 is electrically coupled to VEE.

Drain 794 of NMOS transistor 792 is electrically coupled to a drain 726 of a PMOS transistor 722. PMOS transistor 722 is self-tubbed with a source 724 electrically coupled to a body 730 of PMOS transistor 722. Source 724 of PMOS transistor 722 is electrically coupled to a drain 735 of a PMOS transistor 731. A source 733 of PMOS transistor 731 is electrically coupled to VCC. Drain 804 of NMOS transistor 802 is electrically coupled to a drain 736 of a PMOS transistor 732. PMOS transistor 732 is self-tubbed with a source 734 electrically coupled to a body 740 of PMOS transistor 732. Source 734 of PMOS transistor 732 is electrically coupled to a drain 745 of a PMOS transistor 741. A source 743 of PMOS transistor 741 is electrically coupled to a power supply. Ibias is provided via PMOS transistor 731, and a replica of Ibias is provided via PMOS transistor 741.

Drain 814 of NMOS transistor 812 is electrically coupled to a drain 746 of a PMOS transistor 742. PMOS transistor 742 is self-tubbed with a source 744 electrically coupled to a body 750 of PMOS transistor 742. Source 744 of PMOS transistor 742 is driven by current 232 (I232). Drain 824 of NMOS transistor 822 is electrically coupled to a drain 756 of a PMOS transistor 752. PMOS transistor 752 is self-tubbed with a source 754 electrically coupled to a body 760 of PMOS transistor 752. Source 754 of PMOS transistor 752 is driven by current 256 (Ippref).

Drain 834 of NMOS transistor 832 is electrically coupled to a drain 766 of a PMOS transistor 762. PMOS transistor 762 is self-tubbed with a source 764 electrically coupled to a body 770 of PMOS transistor 762. Source 764 of PMOS transistor 762 is electrically coupled to a drain 755 of a PMOS transistor 751. A source 753 of PMOS transistor 751 is electrically coupled to VCC. Drain 844 of NMOS transistor 842 is electrically coupled to a drain 776 of a PMOS transistor 772. PMOS transistor 772 is self-tubbed with a source 774 electrically coupled to a body 780 of PMOS transistor 772. Source 774 of PMOS transistor 772 is electrically coupled to a drain 765 of a PMOS transistor 761. A source 763 of PMOS transistor 761 is electrically coupled to VCC. I242 is provided via PMOS transistor 751, and a replica of I242 is provided via PMOS transistor 761.

Exemplary third order multiplier 701 additionally includes a current mirror comprised of a PMOS transistor 711 and a PMOS transistor 721. A source 713 of PMOS transistor 711 and a source 723 of PMOS transistor 721 are electrically coupled to VCC. A gate 717 of PMOS transistor 711 is electrically coupled to a gate 727 of PMOS transistor 721, to gate 737 of PMOS transistor 731, to gate 747 of PMOS transistor 741, and to a drain 715 of PMOS transistor 711. Drain 715 is also electrically coupled to a current source 719 operable to induce a current, Ix, through PMOS transistors 711, 721. A drain 725 of PMOS transistor 721 is electrically coupled to a source 714 of a PMOS transistor 712. PMOS transistor 712 is self-tubbed with source 714 electrically coupled to a body 720 of PMOS transistor 712. A gate 718 of PMOS transistor is electrically coupled to ground and to the respective gate of each of PMOS transistors 722, 732, 742, 752, 762, 772, 782. A drain 716 of PMOS transistor 712 is electrically coupled to a drain 894 of an NMOS transistor 892. A source 896 of NMOS transistor 892 is electrically coupled to VEE, and a gate 898 of NMOS transistor 892 is electrically coupled to the respective gate of each of NMOS transistors 902, 912.

Exemplary third order multiplier 701 additionally includes an output stage that provides current 242 as an output. In particular, a PMOS transistor 781 drives current 242 via a source 785 thereof. A gate 788 of PMOS transistor 781 is electrically coupled to a gate 777 of a PMOS transistor 771 and a gate 767 of PMOS transistor 761. In addition, gate 787 of PMOS transistor 781 is electrically coupled to a drain 795 of a PMOS transistor 791 and to a drain 803 of an NMOS transistor 801. Further, gate 787 is electrically coupled to VCC via a capacitor 789. A source 773 of PMOS transistor 771, a source 783 of PMOS transistor 781 and a source 793 of PMOS transistor 791 are each electrically coupled to VCC. A drain 775 of PMOS transistor 771 is electrically coupled to a source 784 of PMOS transistor 782. PMOS transistor 782 is self-tubbed with source 784 electrically coupled to a body 790 of PMOS transistor 782. A drain 786 of PMOS transistor 782 is electrically coupled to a drain 874 of an NMOS transistor 872. A gate 878 of NMOS transistor 872 is electrically coupled to drain 874, to a gate 868 of NMOS transistor 862, and to a gate 858 of NMOS transistor 852. A source 876 of NMOS transistor 872 is electrically coupled to ground.

A gate 797 of PMOS transistor 791 is electrically coupled to a gate 817 of PMOS transistor 811, and to a drain 815 of PMOS transistor 811. A source 813 of PMOS transistor 811 is electrically coupled to VCC. A gate 807 of NMOS transistor 801 is electrically coupled to a gate 847 of an NMOS transistor 841, and to a drain 843 of NMOS transistor 841. A source 805 of NMOS transistor 801 and a source 845 of NMOS transistor 841 are each electrically coupled to ground. Drain 843 of NMOS transistor 841 is electrically coupled to a drain 835 of a PMOS transistor 831. A gate 837 of PMOS transistor 831 is electrically coupled to a gate 827 and a drain 825 of a PMOS transistor 821. A source 823 of PMOS transistor 821 and a source 833 of PMOS transistor 831 are electrically coupled to VCC.

Drain 815 is electrically coupled to a drain 853 of an NMOS transistor 851, and drain 825 of PMOS transistor 821 is electrically coupled to a drain 863 of an NMOS transistor 861. Both NMOS transistor 851 and NMOS transistor 861 are self-tubbed with a body 859 electrically coupled to a source 855 of NMOS transistor 851, and a body 869 electrically coupled to a source 865 of NMOS transistor 861. A gate 857 of NMOS transistor 851 is electrically coupled to a gate 867 of NMOS transistor 861, and each are electrically coupled to ground. Source 855 of NMOS transistor 851 is electrically coupled to a drain 873 of an NMOS transistor 871, and source 865 of NMOS transistor 861 is electrically coupled to a drain 883 of an NMOS transistor 881. Both NMOS transistor 871 and NMOS transistor 881 are self-tubbed with a body 879 electrically coupled to a source 875 of NMOS transistor 871, and a body 889 electrically coupled to a source 885 of NMOS transistor 881. A gate 877 of NMOS transistor 871 is electrically coupled to gate 848 of NMOS transistor 842, and a gate 887 of NMOS transistor 881 is electrically coupled to drain 794 of NMOS transistor 792. Source 875 of NMOS transistor 871 is electrically coupled to source 885 of NMOS transistor 881, and to a drain 893 of an NMOS transistor 891. A source 895 of NMOS transistor 891 is electrically coupled to VEE, and a gate 897 of NMOS transistor 891 is electrically coupled to a gate 918 of NMOS transistor 912, a gate 908 of NMOS transistor 902, and a gate 898 of NMOS transistor 892.

Figure 3:
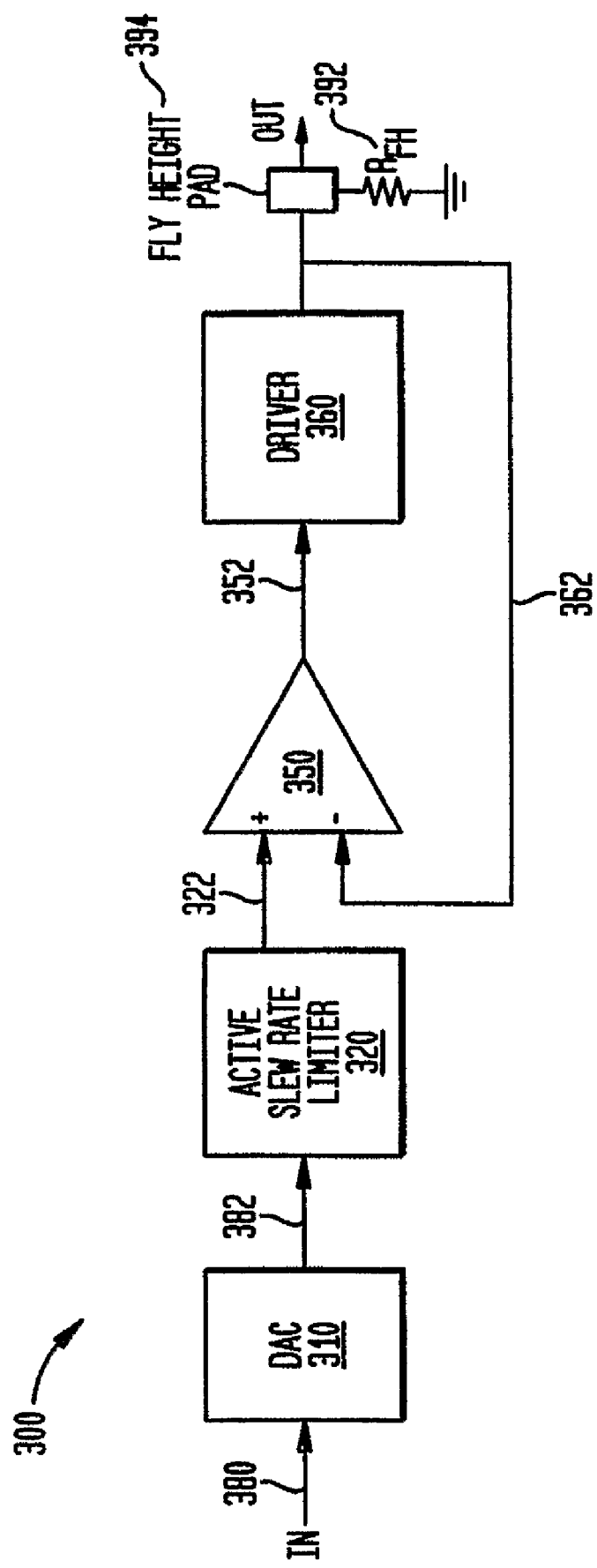
FIG. 3 depicts another active slew rate control in accordance with other embodiments of the present invention.

In contrast to the embodiments of the present invention described in relation to FIGS. 2*a*-2*d* above that provide for a fixed power output, other embodiments of the present invention provide for a fixed voltage output. One such embodiment of a fixed voltage output circuit 300 is depicted in FIG. 3. In particular, fixed voltage output circuit 300 includes a digital to analog converter 310, an active slew rate limiter circuit 320, an operational amplifier 350, and a driver 360 that are each similar to their corresponding counterparts in circuit 200 described above. In operation, digital to analog converter 310 receives a digital input code 380 (e.g., 0 to 63), and provides an output current 382 corresponding to digital input code 380. Digital input code 380 corresponds to a fixed voltage that is to be delivered to the pad of fly height driver line 135. Similar to that described in relation to FIG. 2*a* above, anytime digital input code 380 changes, a corresponding change in output current 382 from digital to analog converter 310 occurs. The current transition may exhibit a very large slew rate that results in cross coupling between fly height driver line 135 and other proximate lines.

Current 382 of digital analog converter 310 is provided to slew rate limiter circuit 320 which operates in conjunction with other elements of circuit 300 to provide an output with a governed slew rate when compared with the slew rate of transitioning current 382, and thereby to lower cross coupling evident at the associated read/write head assembly. Slew rate limiter circuit 320 converts current 382 from digital to analog converter 310 to a representative voltage, and provides a voltage output 322 to operational amplifier 350. Operational amplifier 350 provides a constant voltage 352 to driver 360. Driver 360, which may be a simple operational amplifier circuit, drives a constant voltage to a fly height pad 394 that is electrically coupled to a fly height resistor 392. In addition, driver 360 provides a feedback voltage 362 to second order multiplier 350. In contrast to circuit 200, output 322 from active slew rate limiter circuit 320 bypasses any voltage to current conversion and is instead provide directly to operational amplifier 350, which behaves like a standard operational amplifier. As another contrast to circuit 200, the $I_{tail}$ current source (corresponding to current source 246 of circuit 200) of circuit 300 is a fixed current and is not provided via a feedback loop.

Figure 4:
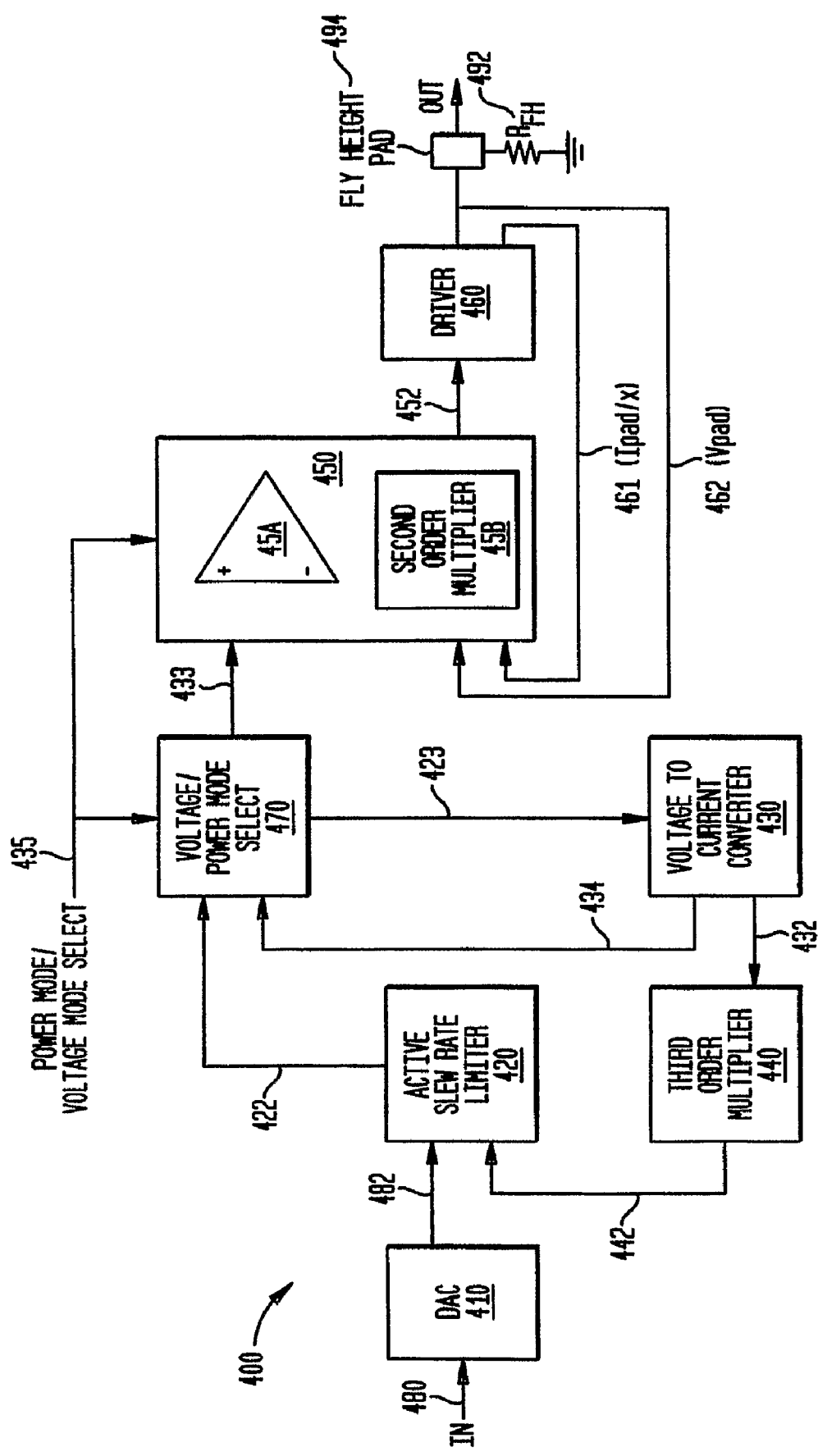
FIG. 4 depicts a combination slew rate control in accordance with yet other embodiments of the present invention.

Turning now to FIG. 4, a combination circuit 400 in accordance with various embodiments of the present invention is depicted. Combination circuit 400 is capable of providing a constant power dissipation across a fly height resistor 492 in a power mode, or a constant voltage at a fly height pad 494 in a voltage mode. Selection between power mode and voltage mode is accomplished by asserting a selector 435 at one assertion level or another. Combination circuit 400 includes a digital to analog converter 410 that is similar to digital to analog converter 210 described above. Further, combination circuit 400 includes an active slew rate limiter circuit 420 that is capable of providing a constant $I_{tail}$ value in voltage mode, and a variable $I_{tail}$ value when operated in power mode. Combination circuit 400 also includes a third order multiplier 440 that is similar to third order multiplier 240 described above, and a voltage to current converter 430 that is similar to voltage to current converter 230 described above. Combination circuit 400 also includes a multiplier/amplifier 450 that is configurable to operate as an operational amplifier 451 in voltage mode, or a second order multiplier 453 in power mode depending upon an assertion level of selector 435. Multiplier/amplifier 450 provides an output 452 to a driver 460. A selector circuit 470 is also included to select between operation in the voltage mode or the power mode depending upon the assertion level of selector 435.

In operation, digital to analog converter 410 receives a digital input code 480 (e.g., 0 to 63), and provides an output current 482 corresponding to digital input code 480. Digital input code 480 corresponds to a fixed power that is to be delivered to the pad of fly height driver line 135 when operated in power mode, or a fixed voltage when operated in voltage mode. Anytime digital input code 480 changes, a corresponding change in output current 482 from digital to analog converter 410 occurs. The current transition may exhibit a very large slew rate that results in cross coupling between fly height driver line 135 and other proximate lines.

Current 482 of digital analog converter 410 is provided to slew rate limiter circuit 420 which operates in conjunction with other elements of combination circuit 400 to provide an output with a governed slew rate when compared with the slew rate of transitioning current 482, and thereby to lower cross coupling evident at the associated read/write head assembly. Slew rate limiter circuit 420 converts current 482 from digital to analog converter 410 to a representative voltage, and provides a voltage output 422.

When power mode is selected via selector 435, voltage output 422 is provided via selector circuit 470 to voltage to current converter 430 as a signal 423. Voltage to current converter 430 converts the received voltage 422 to a current 432, and provides current 432 to a third order multiplier 440 that multiplies current 432 to provide a current 442. Current 442 is fed back to active slew rate limiter circuit 420 where it acts as a variable current source that in part controls the slew rate of output voltage 422. In addition, a current proportional to the desired output power (i.e., a target current 434 ($I_{434}$)) is provided by voltage to current converter 430 to multiplier/amplifier 450 configured to operate as second order multiplier 453. Current 434 is a mirrored copy of current 432, and is provided to multiplier/amplifier 450 via selector circuit 470 as signal 433 (i.e., current 434 is passed through selector circuit 470 as current 433). In addition, a feedback voltage 462 ($V_{pad}$), a feedback current 461 ($I_{pad}$/k), and a bias current ($I_{bias}$—not shown) that is used as a gain controlling factor are provided to second order multiplier 453. Second order multiplier 453 converts voltage 462 to a current equal to Vpad divided by Rpp ($I_{pp}$). In turn, $I_{pp}$ is multiplied by $I_{pad}$/K and divided by $I_{bias}$, and the product of the multiplied and divided currents is compared with target current 434 (received as current 433). Second order multiplier 453 additionally functions as an operational amplifier, driving the voltage at fly height pad 494 through driver 460 such that the product of the multiplied and divided currents is equal to the target current.

Alternatively, when voltage mode is selected via selector 435, voltage output 422 is provided directly to multiplier/amplifier 450 that is configured to operate as operational amplifier 451 via selector circuit 470 and signal 433. Operational amplifier 451 provides a constant voltage 452 to driver 460. Driver 460, which may be a simple operational amplifier circuit, drives a constant voltage to fly height pad 494 that is electrically coupled to fly height resistor 492. In addition, driver 460 provides a feedback voltage 462 to second order multiplier 450.

In conclusion, the present invention provides novel systems, methods and arrangements for error reduction. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for reducing cross coupling in proximate signals, the system comprising:
    a signal input;
    a signal output;
    an active slew rate limiter circuit, wherein the active slew rate limiter circuit is operable to receive a derivative of the signal input and to provide a derivative of the signal output, and wherein the active slew rate limiter circuit includes at least one active element configured to reduce a slew rate of the signal output relative to the signal input;
    a feedback circuit including: a voltage to current converter; and a third order multiplier coupled to the voltage to current converter, wherein the third order multiplier is operable to receive an output of the voltage to current converter and to provide a multiplied output based at least in part on the output of the voltage to current converter; and
    wherein the multiplied output is provided as an input to the active slew rate limiter circuit.

2. The system of claim 1, wherein the at least one active element includes at least one transistor.

3. The system of claim 1, wherein the active slew rate limiter circuit includes:
   a current source;
   an input stage, wherein the input stage includes a first transistor and a second transistor, wherein a gate of the first transistor is coupled to a voltage input, wherein a gate of the second transistor is coupled to a voltage output, wherein a source of the first transistor is coupled to a source of the second transistor, and wherein the source of the first transistor is coupled to the current source;
   a current mirror stage, wherein the current mirror stage includes a third transistor and a fourth transistor, wherein a gate of the third transistor is coupled to a drain of the third transistor, wherein the gate of the third transistor is coupled to a gate of the fourth transistor, and wherein the drain of the fourth transistor is coupled to the gate of the second transistor; and
   a capacitance coupled to the voltage output.

4. The system of claim 3, wherein the first transistor and the second transistor are self-tubbed.

5. The system of claim 3, wherein the current source is modifiable, and wherein modifying the current source is operable to modify a slew rate characteristic of the active slew rate limiter circuit.

6. The system of claim 5, wherein the current source is implemented using a two bit digital to analog converter.

7. The system of claim 3, wherein the current mirror is a first current mirror, and wherein the active slew rate limiter circuit further includes:
   a second current mirror, wherein the second current mirror includes a fifth transistor and a sixth transistor, wherein a gate of the fifth transistor is coupled to a gate of the sixth transistor, wherein the gate of the sixth transistor is coupled to a drain of the sixth transistor, wherein the drain of the sixth transistor is coupled to a drain of the second transistor, and wherein a drain of the fifth transistor is coupled to the drain of the third transistor; and
   a third current mirror, wherein the third current mirror includes a seventh transistor and an eighth transistor, wherein a gate of the seventh transistor is coupled to a gate of the eighth transistor, wherein the gate of the eighth transistor is coupled to a drain of the eighth transistor, wherein the drain of the eighth transistor is coupled to a drain of the first transistor, and wherein a drain of the seventh transistor is coupled to the drain of the fourth transistor.

8. The system of claim 7, wherein the active slew rate limiter circuit further includes:
   a sleep mode circuit, wherein the sleep mode circuit includes a ninth transistor; and
   wherein a gate of the ninth transistor is coupled to a sleep control signal, and wherein a drain of the ninth transistor is coupled to the gate of the second transistor.

9. The system of claim 3, wherein the active slew rate limiter circuit further includes:
   a low pass filter, wherein the voltage input is provided to the gate of the first transistor via the low pass filter.

10. The system of claim 1, wherein the system further comprises:
    an output circuit, wherein the output circuit includes: a multiplier/amplifier; and a driver, wherein an output of the multiplier/amplifier is provided as an input to the driver; and
    wherein the derivative of the signal output is provided to the multiplier/amplifier, and wherein the driver drives the signal output based at least in part on the derivative of the signal output.

11. The system of claim 10, wherein the system may be selectably configured to operate in a mode selected from a group consisting of: a power mode and a voltage mode.

12. The system of claim 11, wherein the signal output is a fly height driver signal associated with a storage device, and wherein selecting the power mode causes the multiplier/amplifier to act at least as a second order multiplier, and results in substantially constant power dissipation in a resistor associated with a read/write head assembly of the storage device.

13. The system of claim 11, wherein selection of the voltage mode causes the multiplier/amplifier to operate as an amplifier, and wherein the feedback circuit is bypassed.

14. A storage device, wherein the storage device comprises:
    a storage media;
    a read/write head assembly disposed adjacent to the storage media, wherein the read/write head assembly is operable to access information from the storage media; and
    a slew rate control circuit, wherein the slew rate control circuit is coupled to the read/write head assembly, and wherein expansion of the read/write head assembly is limited at least in part by operation of the slew rate control circuit.

15. The storage device of claim 14, wherein the storage media is a hard disk drive platter.

16. The storage device of claim 14, wherein the slew rate control circuit includes:
    a signal input;
    a signal output; and
    an active slew rate limiter circuit, wherein the active slew rate limiter circuit is operable to receive a derivative of the signal input and to provide a derivative of the signal output, and wherein the active slew rate limiter circuit includes at least one active element configured to reduce a slew rate of the signal output relative to the signal input.

17. The storage device of claim 16, wherein the wherein the slew rate control circuit further includes:
    a feedback circuit, wherein the feedback circuit includes: a voltage to current converter; and a third order multiplier electrically coupled to the voltage to current converter circuit, wherein the third order multiplier circuit receives an output of the voltage to current converter and provides a multiplier output based at least in part on the output of the voltage to current converter; and
    wherein the derivative of the signal output is provided as an input to the voltage to current converter, and wherein the multiplier output is provided to the active slew rate limiter circuit.

18. The storage device of claim 17, wherein the wherein the slew rate control circuit further includes:
    an output circuit, wherein the output circuit includes: a second order multiplier; and a driver, wherein an output of the second order multiplier is provided as an input to the driver; and
    wherein the derivative of the signal output is provided to the second order multiplier, and wherein the driver drives the signal output based at least in part on the derivative of the signal output.

19. The storage device of claim 14, wherein the slew rate control circuit is operable to cause the read/write head assembly to dissipate power at a substantially constant rate.

20. A data processing system, the system comprising:
a slew rate limiter circuit operable to receive an input signal and to provide an output signal,
a feedback circuit including:
  a voltage to current converter; and a third order multiplier coupled to the voltage to current converter, wherein the third order multiplier is operable to receive an output of the voltage to current converter and to provide a multiplied output based at least in part on the output of the voltage to current converter; and
  wherein the multiplied output is provided as an input to the slew rate limiter circuit.

21. The system of claim 20, the system further comprising:
a storage media;
a read/write head assembly disposed adjacent to the storage media and operable to access information from the storage media, wherein the slew rate control circuit is coupled to the read/write head assembly, and wherein the slew rate control circuit is operable to cause the read/write head assembly to dissipate power at a substantially constant rate.

22. The system of claim 21, wherein expansion of the read/write head assembly is limited at least in part by operation of the slew rate control circuit.

23. The system of claim 20, wherein the slew rate limiter circuit includes at least one active element configured to reduce a slew rate of the signal output relative to the signal input.

24. The system of claim 23, wherein the at least one active element includes at least one transistor.

25. The system of claim 20, wherein the slew rate limiter circuit includes:
a current source;
an input stage including a first transistor and a second transistor, wherein a gate of the first transistor is coupled to a voltage input, wherein a gate of the second transistor is coupled to a voltage output, wherein a source of the first transistor is coupled to a source of the second transistor, and wherein the source of the first transistor is coupled to the current source;
a current mirror stage including a third transistor and a fourth transistor, wherein a gate of the third transistor is coupled to a drain of the third transistor, wherein the gate of the third transistor is coupled to a gate of the fourth transistor, and wherein the drain of the fourth transistor is coupled to the gate of the second transistor; and
a capacitance coupled to the voltage output.

26. The system of claim 25, wherein the current source is modifiable, and wherein modifying the current source is operable to modify a slew rate characteristic of the active slew rate limiter circuit.

27. The system of claim 25, wherein the current mirror is a first current mirror, and wherein the active slew rate limiter circuit further includes:
a second current mirror including a fifth transistor and a sixth transistor, wherein a gate of the fifth transistor is coupled to a gate of the sixth transistor, wherein the gate of the sixth transistor is coupled to a drain of the sixth transistor, wherein the drain of the sixth transistor is coupled to a drain of the second transistor, and wherein a drain of the fifth transistor is coupled to the drain of the third transistor; and
a third current mirror including a seventh transistor and an eighth transistor, wherein a gate of the seventh transistor is coupled to a gate of the eighth transistor, wherein the gate of the eighth transistor is coupled to a drain of the eighth transistor, wherein the drain of the eighth transistor is coupled to a drain of the first transistor, and wherein a drain of the seventh transistor is coupled to the drain of the fourth transistor.

28. The system of claim 27, wherein the slew rate limiter circuit further includes:
a sleep mode circuit, wherein the sleep mode circuit includes a ninth transistor; and
wherein a gate of the ninth transistor is coupled to a sleep control signal, and wherein a drain of the ninth transistor is coupled to the gate of the second transistor.

29. The system of claim 25, wherein the slew rate limiter circuit further includes:
a low pass filter, wherein the voltage input is provided to the gate of the first transistor via the low pass filter.

* * * * *